US011962186B2

(12) United States Patent
Walker et al.

(10) Patent No.: US 11,962,186 B2
(45) Date of Patent: Apr. 16, 2024

(54) ROTARY ELECTRIC MACHINE

(71) Applicant: The Boeing Company, Chicago, IL (US)

(72) Inventors: Steven P. Walker, Arlington, WA (US); Christopher E. Plass, Snohomish, WA (US); Matthew Edmunds, Marysville, WA (US)

(73) Assignee: The Boring Company, Chicago, IL (US)

( * ) Notice: Subject to any disclaimer, the term of this patent is extended or adjusted under 35 U.S.C. 154(b) by 271 days.

(21) Appl. No.: 17/578,633

(22) Filed: Jan. 19, 2022

(65) Prior Publication Data

US 2022/0243683 A1     Aug. 4, 2022

Related U.S. Application Data

(60) Provisional application No. 63/144,717, filed on Feb. 2, 2021.

(51) Int. Cl.
*H02K 1/16*        (2006.01)
*H02K 1/2706*     (2022.01)
*H02P 27/06*      (2006.01)

(52) U.S. Cl.
CPC ............. *H02K 1/16* (2013.01); *H02K 1/2706* (2013.01); *H02P 27/06* (2013.01)

(58) Field of Classification Search
CPC .... H04B 3/23; B64D 2027/026; B64D 27/10; B64D 27/24; H02K 1/12; H02K 1/16; H02K 1/185; H02K 1/246; H02K 1/2706; H02K 19/103; H02K 2201/12; H02K 2205/03; H02K 29/03; H02K 7/083; H02K 7/14; H02P 27/06; Y02T 50/60
See application file for complete search history.

(56) References Cited

U.S. PATENT DOCUMENTS

| | | | | |
|---|---|---|---|---|
| 7,603,864 | B2 * | 10/2009 | Gemin | F01D 15/10 290/1 A |
| 2013/0026864 | A1 * | 1/2013 | Bae | H02K 19/103 310/46 |
| 2014/0197715 | A1 * | 7/2014 | (one name) | H02K 9/02 310/216.106 |

\* cited by examiner

*Primary Examiner* — Naishadh N Desai
(74) *Attorney, Agent, or Firm* — Quinn IP Law (57) ABSTRACT

A rotary electric machine arranged as a brushless electric ring motor is described and includes a rotor that is disposed within a stator and arranged to rotate on a guide element. The rotor has a plurality of ferritic elements arranged on an outer surface, and the stator is an annular device having a plurality of electro-magnetic elements arranged on an inner portion between first and second flanges. The first and second flanges both include an annular ring that is fabricated from a non-magnetic material and has a plurality of ferromagnetic elements. The ferromagnetic elements are magnetically coupled to corresponding ones of the electromagnetic elements to exert magnetic force on the ferritic elements of the rotor when the electro-magnetic elements are activated. The rotary electric machine may operate as a first thrust generating system that is upstream of a second thrust generating system for a turbojet engine.

20 Claims, 5 Drawing Sheets

ROTARY ELECTRIC MACHINE

CROSS-REFERENCE TO RELATED APPLICATIONS

This application claims the benefit of U.S. Provisional Patent Application No. 63/144,717 filed on Feb. 2, 2021, the disclosure of which is hereby incorporated by reference in its entirety.

TECHNICAL FIELD

The present disclosure is generally related to a rotary electric machine and associated method and apparatus, including for use in aircraft propulsion.

BACKGROUND

Rotary electric machines may include a rotor and a stator, wherein electric power is converted to mechanical power in the form of torque using sequentially applied electromagnetic power. Examples of rotary electric machines include permanent magnet electric machines and reluctance machines. A reluctance machine is a type of electric motor that induces non-permanent magnetic poles on a rotor, wherein the rotor has no windings. Instead, torque is generated through magnetic reluctance. Reluctance motor types include synchronous, variable, switched and variable stepping motors. Higher operating temperature environments may preclude the use of a permanent magnet electric machine due to a loss of magnetism.

Turbine jet engines may be utilized to propel an aircraft, such as an airplane. Turbine jet engines may rely upon gas expansion from combustion of a fuel to provide a motive force for rotation of one or more compressors and/or turbines.

There may be benefits to incorporating a rotary electric machine capable of extreme temperature operation into a turbine jet engine, with such benefits related to reduced consumption of fossil fuels, improved controllability, improved durability, etc.

SUMMARY

The concepts described herein provide a rotary electric machine that is capable at operating in extreme temperature environments, such as may be experienced in a turbine jet engine. In one embodiment, the concepts include a rotary electric machine arranged as a brushless electric ring motor that has an inner rotor that is disposed within an outer stator and arranged to rotate therein on a guide element. The rotor is an annular device having a plurality of ferritic elements arranged on an outer surface, and the stator is an annular device having a plurality of electro-magnetic elements arranged on an inner portion thereof between a first flange and a second flange. Each of the first and second flanges includes an annular ring that is fabricated from a non-magnetic material and has a plurality of radially-oriented, inwardly-projecting ferromagnetic elements. The plurality of radially-oriented, inwardly-projecting ferromagnetic elements are magnetically coupled to corresponding ones of the electro-magnetic elements, and are arranged to exert magnetic force on the plurality of ferritic elements when the plurality of electro-magnetic elements are electrically activated. The guide element for the rotor is disposed between the first flange and the second flange of the stator. In one embodiment, the rotary electric machine may be arranged as a multipole synchronous reluctance electric machine.

The concepts herein further provide for a thrust generating system for a turbojet engine that includes a plurality of radially-oriented fan blades mounted on an inner surface of a rotor of a rotary electric machine. The plurality of radially-oriented fan blades are joined at an axial center of the rotor of the rotary electric machine. The rotary electric machine includes the rotor disposed within a stator and arranged to rotate therein on a guide element, wherein the rotor is an annular device having a plurality of ferritic elements arranged thereon that are equidistantly spaced on an outer surface, and wherein the stator is an annular device having a plurality of electro-magnetic elements arranged thereon that are equidistantly spaced on an inner portion thereof and arranged between a first flange and a second flange. Each of the first and second flanges includes an annular ring that is fabricated from a non-magnetic material and has a plurality of radially-oriented, inwardly-projecting ferromagnetic elements. The plurality of radially-oriented, inwardly-projecting ferromagnetic elements are magnetically coupled to corresponding ones of the electro-magnetic elements, and are arranged to exert a magnetic force on the plurality of ferritic elements when the plurality of electro-magnetic elements are electrically activated. The guide element for the rotor is disposed between the first flange and the second flange of the stator.

The concepts herein further provide for a turbojet engine having a first thrust generating system arranged upstream of a second thrust generating system. The first thrust generating system includes a plurality of radially-oriented fan blades mounted on an inner surface of a rotor of a rotary electric machine, and the plurality of radially-oriented fan blades are joined at an axial center of the rotor of the rotary electric machine. The rotary electric machine includes the rotor disposed within a stator and arranged to rotate therein on a guide element, wherein the rotor is an annular device having a plurality of ferritic elements arranged thereon that are equidistantly spaced on an outer surface, and wherein the stator is an annular device having a plurality of electro-magnetic elements arranged thereon that are equidistantly spaced on an inner portion thereof and arranged between a first flange and a second flange. Each of the first and second flanges includes an annular ring that is fabricated from a non-magnetic material and has a plurality of radially-oriented, inwardly-projecting ferromagnetic elements. The plurality of radially-oriented, inwardly-projecting ferromagnetic elements are magnetically coupled to corresponding ones of the electro-magnetic elements, and are arranged to exert a magnetic force on the plurality of ferritic elements when the plurality of electro-magnetic elements are electrically activated. The guide element for the rotor is disposed between the first flange and the second flange of the stator.

The concepts herein further provide for a method for arranging a rotary synchronous reluctance electric machine that includes fabricating an annular rotor, including arranging a plurality of ferretic elements on an outer surface of a non-ferretic annular ring, including a plurality of first ferretic elements and a plurality of second ferretic elements, wherein the first ferretic elements are arranged in alternating manner with the second ferretic elements. The method further includes fabricating an annular stator, including arranging a plurality of electro-magnetic elements between a first flange and a second flange, wherein each of the first and second flanges is an annular ring that is fabricated from a non-magnetic material, and wherein each of the electro-magnetic elements includes an electro-magnetic coil, a core, and radially-oriented, inwardly-projecting ferromagnetic elements. A guide element is arranged on an inner portion between the first flange and the second flange, and the annular rotor is arranged on the guide element of the annular stator, wherein the annular rotor is rotatable on the guide element on an inner portion of the annular stator.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

One or more embodiments will now be described, by way of example, with reference to the accompanying drawings, in which.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

For purposes of convenience and clarity only, directional terms such as top, bottom, left, right, up, over, above, below, beneath, rear, and front, may be used with respect to the drawings. These and similar directional terms are not to be construed to limit the scope of the disclosure.

As employed herein, the term "upstream" and related terms refer to elements that are towards an origination of a flow stream relative to an indicated location, and the term "downstream" and related terms refer to elements that are away from an origination of a flow stream relative to an indicated location. Furthermore, the disclosure, as illustrated and described herein, may be practiced in the absence of an element that is not specifically disclosed herein.

Referring to the drawings, wherein like reference numerals correspond to like or similar components throughout the several Figures, FIGS. 1, 2, 3 and 4 illustrate a rotary electric machine 100 that is arranged as a synchronous reluctance electric ring motor. The rotary electric machine 100 is described with reference to an axial or x-axis 7, a y-axis 8, and z-axis 9. The rotary electric machine 100 includes a stator 20 and a rotor 50 that are configured in an axial pole arrangement. Arrow 12 indicates a direction of rotation of the rotor 50 in relation to the stator 20. The rotor 50 may be equipped with a fan 90 that is composed of a plurality of radially-disposed fan blades 91 that are joined at a central hub 94 and is capable of propelling air in one embodiment.

Figure 1:
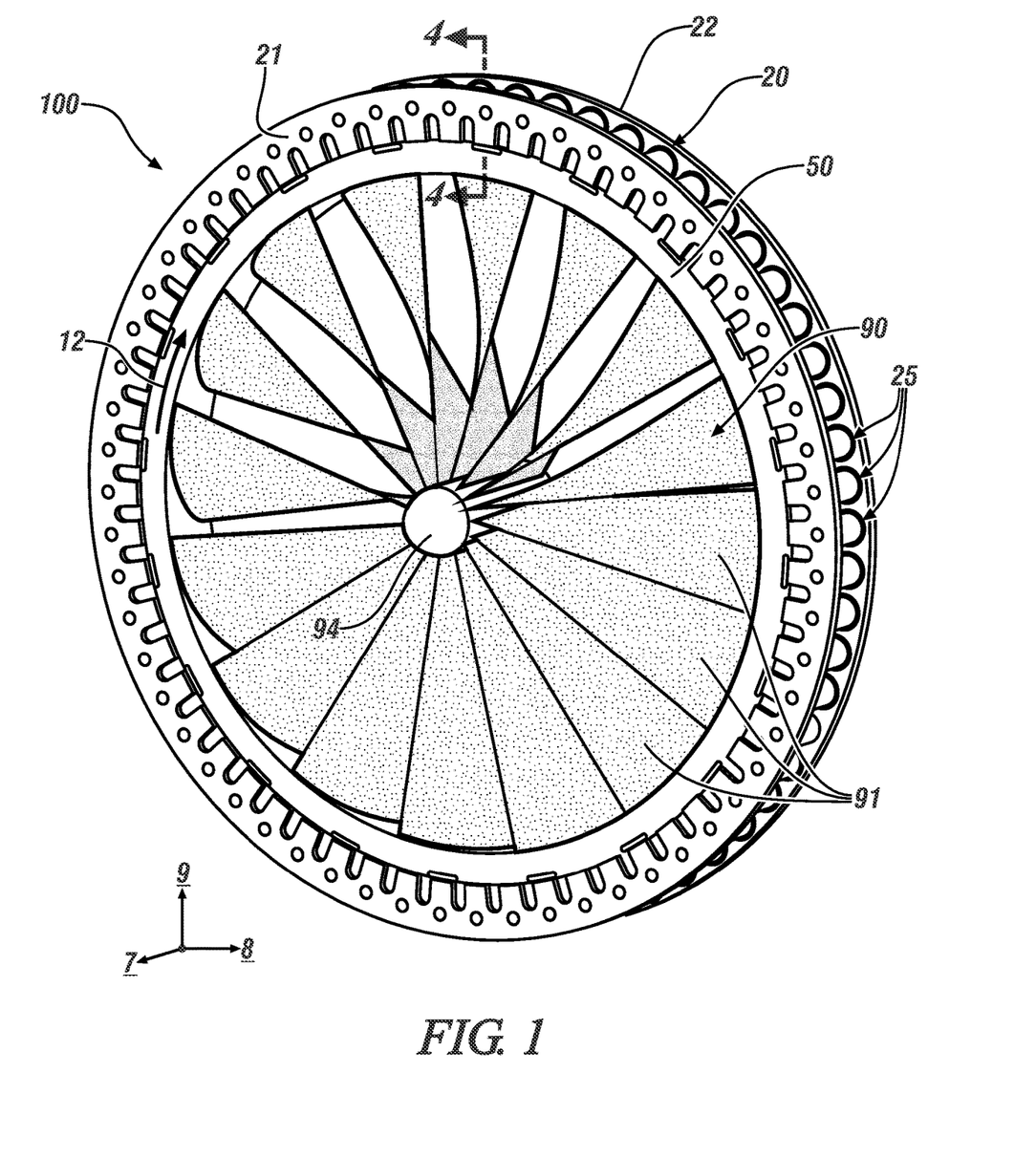
FIG. 1 schematically illustrates a three-dimensional isometric view of a rotary electric machine including a brushless electric ring motor and fan, in accordance with the disclosure.
Figure 2:
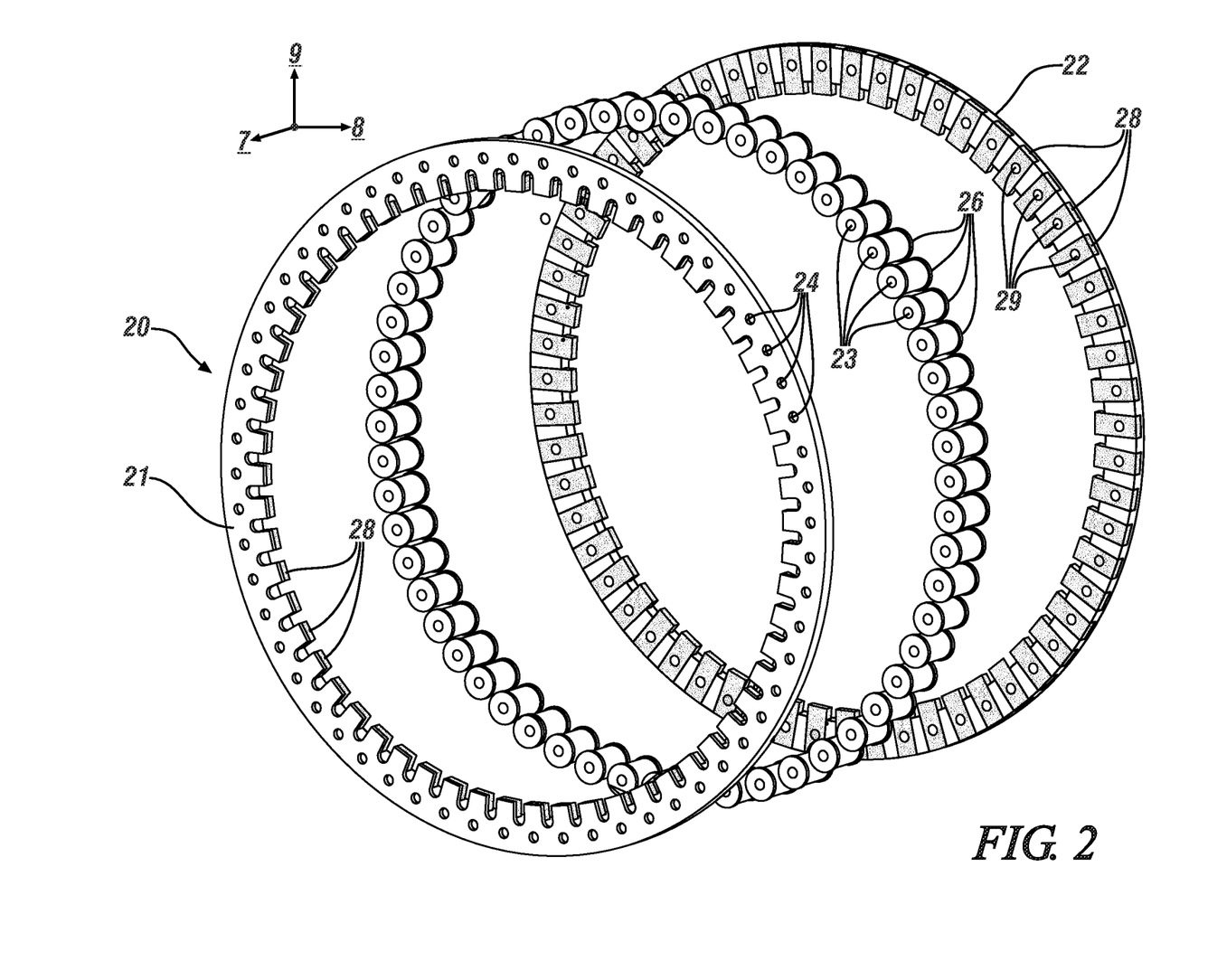
FIG. 2 schematically illustrates an exploded three-dimensional isometric view of a stator for a brushless electric ring motor, in accordance with the disclosure.

When the rotor 50 with fan 90 is configured in this manner, the power is applied to the plurality of fan blades 91 at the tip, in line with the maximum shear and bending stiffness. Strength requirements at the blade root are minimum.

An electrical power system 110 and controller 101 for controlling operation of an embodiment of the rotary electric machine 100 are described with reference to FIG. 6.

Referring again to FIGS. 1-4, the rotor 50 and the stator 20 of the rotary electric machine 100 are both arranged as coaxial annular devices, with the rotor 50 being disposed to rotate on a guide element 13 within the stator 20 in one embodiment.

The stator 20 includes a first flange 21, a second flange 22, a plurality of controllable electro-magnetic elements 25, and the guide element 13. In one embodiment, there is a quantity of sixty (60) controllable electro-magnetic elements 25 that are positioned at radial lines that are spaced each 6° of rotation about the x-axis 7. An arrangement that includes an embodiment of the stator 20 with a second quantity of sixty (60) controllable electro-magnetic elements 25 and an embodiment of the rotor 50 with the first quantity of twenty (20) ferritic elements 60 can result in a 3-phase, 20-pole operation, since the ratio of the first quantity to the second quantity is 1:3. It is appreciated that there can be other embodiments having other pole counts and other phase counts.

The first and second flanges 21, 22 are annular, disk-shaped devices that are fabricated from a non-ferritic material, e.g., aluminum, aluminum alloy, composite material, etc., and have a plurality of equally-spaced apertures 24. The first and second flanges 21, 22 each has a plurality of radially-oriented, inwardly-projecting ferromagnetic elements 28 that are circumferentially arranged and attached to an inner portion 32 thereof. Each of the plurality of radially-oriented, inwardly-projecting ferromagnetic elements 28 is electrically and magnetically isolated from adjacent ones of the ferromagnetic elements 28. Each of the radially-oriented, inwardly-projecting ferromagnetic elements 28 may be configured as a rectangular plate that has an aperture 29 that passes through a surface thereof. The apertures 29 of the radially-oriented, inwardly-projecting ferromagnetic elements 28 are collocated with the plurality of equally-spaced apertures 24 of one of the first and second flanges 21, 22, and are arranged to accommodate cores 27 of the electro-magnetic element 25 when the stator 20 is assembled. Each of the controllable electro-magnetic elements 25 is formed by an electro-magnetic coil 26, one of the cores 27, one of the radially-oriented, inwardly-projecting ferromagnetic elements 28 arranged on the first flange 21, and an axially opposed one of the radially-oriented, inwardly-projecting ferromagnetic elements 28 arranged on the second flange 22. In one embodiment, and as shown, spacers 31 fabricated from non-ferritic material may be inserted between the radially-oriented, inwardly-projecting ferromagnetic elements 28 and the corresponding first flange 21 or second flange 22. Each of the electro-magnetic coils 26 may be fabricated from copper wire or other conductive material, and includes a center aperture 23 through which one of the cores 27 passes. Each of the cores 27 is fabricated from ferromagnetic material and is electrically and magnetically conductive. In one embodiment, the cores 27 are steel fasteners, such as bolts, rivets, etc. The core 27, the corresponding one of the radially-oriented, inwardly-projecting ferromagnetic elements 28 arranged on the first flange 21, and the axially opposed one of the radially-oriented, inwardly-projecting ferromagnetic elements 28 arranged on the second flange 22 are mechanically coupled and form a connection through which electro-magnetic force generated by activation of the electro-magnetic coil 26 can be transferred to exert a magnetic reluctance force upon the rotor 50. The core 27 mechanically connects the first flange 21, the corresponding one of the radially-oriented, inwardly-projecting ferromagnetic elements 28 arranged on the first flange 21, the axially opposed one of the radially-oriented, inwardly-projecting ferromagnetic elements 28 arranged on the second flange 22, and the second flange 22, in one embodiment. The guide element 13 includes first and second thrust washers 14 and a radial washer 16 that are fabricated from non-ferritic materials.

Figure 3:
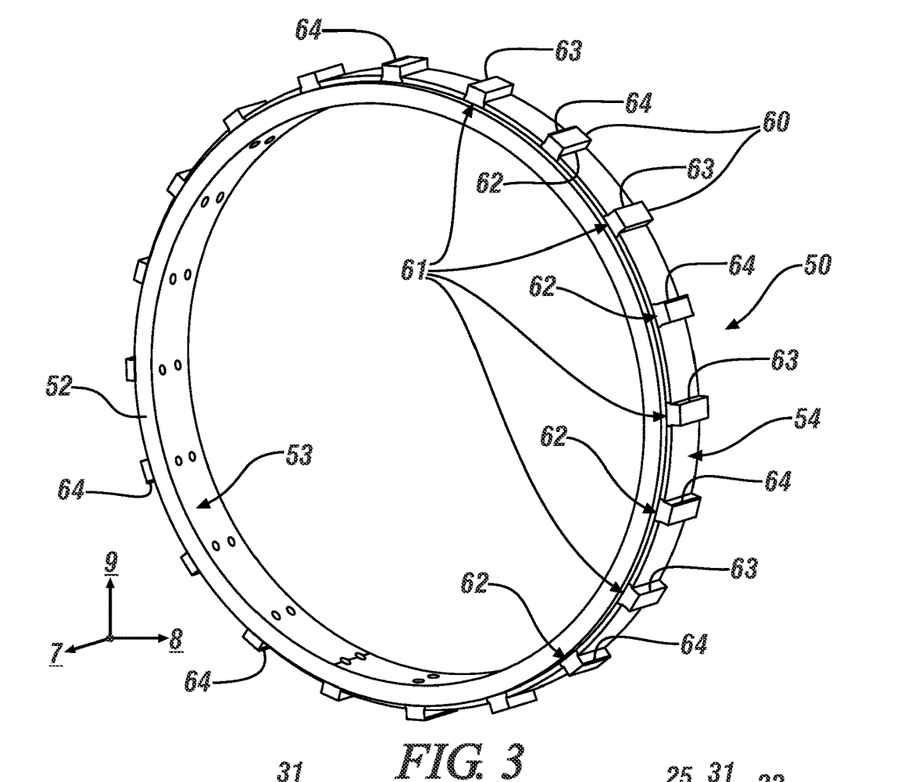
FIG. 3 schematically illustrates an exploded three-dimensional isometric view of a rotor for a brushless electric ring motor, in accordance with the disclosure.

The rotor 50 includes a rotor ring 52 that is fabricated from a non-ferritic material, e.g., aluminum, aluminum alloy, or a composite material. The rotor ring 52 is arranged as a cylindrical device that has an inner surface 53 and an outer surface 54. The rotor ring 52 has a plurality of ferritic elements 60 that are attached on the outer surface 54. In one embodiment, the ferritic elements 60 are equidistantly spaced about the circumference of the outer surface 54. In one embodiment, the rotor ring 52 includes a first quantity of twenty (20) ferritic elements 60 that are positioned at radial lines that are spaced each 18° of rotation about the x-axis 7 and on the outer surface 54 around the circumference of the rotor ring 52.

In one embodiment, the ferritic elements 60 include a first ferritic element 61 and a second ferritic element 62 that are placed in an alternating manner on the outer surface 54 of the rotor 50. In one embodiment, the ferritic elements 60 are fabricated from electrical steel, which is an iron alloy tailored to produce specific magnetic properties that may include a small hysteresis area resulting in low power loss per cycle, low core loss, and high permeability. Electrical steel is an iron alloy which may have from zero to 6.5% silicon (Si:5Fe). Commercial alloys may have silicon content up to 3.2%. Manganese and aluminum can be added up to 0.5%. In one embodiment, the electrical steel is a grain-oriented electrical steel. The use of electrical steel for fabrication of the ferritic elements 60 enables continuous operation of the rotary electric machine 100 at sustained high temperatures without loss of power, because there is no risk of loss of magnetic force between the ferritic elements 60 and the electro-magnetic elements 25 at high temperatures. Permanent magnets are prone to lose magnetic force at temperatures greater than 80 C.

Figure 4:
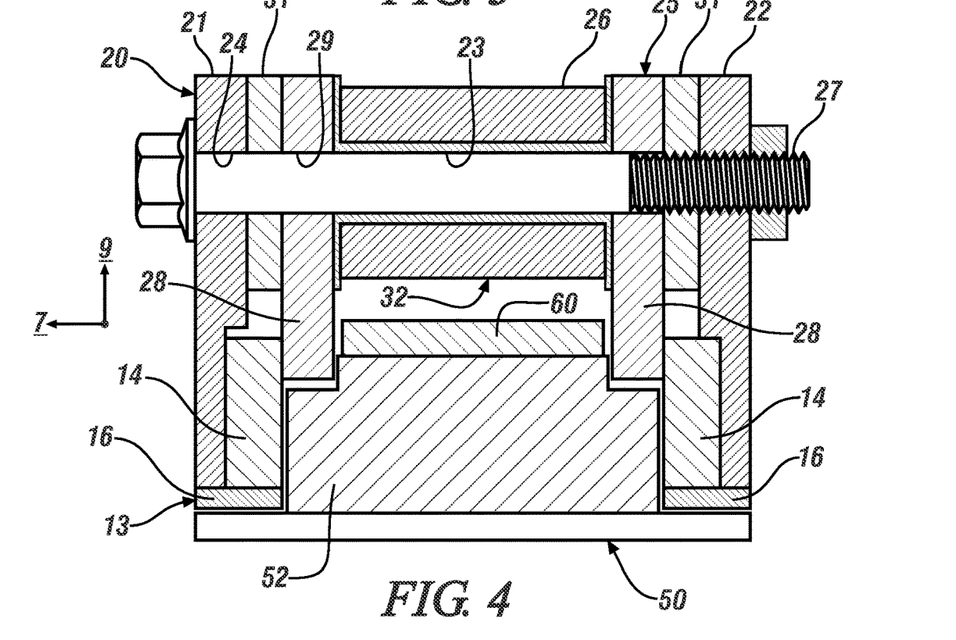
FIG. 4 schematically illustrates a cross-sectional view of a stator and a rotor for a brushless electric ring motor, in accordance with the disclosure.

The rotary electric machine 100 is configured in an axial pole arrangement, with the first ferritic elements 61 and the second ferritic elements 62 of the rotor 50 being rectangular prism elements in one embodiment. Alternatively, the first and second ferritic elements 61, 62 may be another configuration, such as trapezoidal prism elements, triangular prism elements, etc. Regardless of the configuration of the first and second ferritic elements 61, 62, each of the first ferritic elements 61 has a rectangular leading edge 63 and each of the second ferritic elements 62 has a rounded leading edge 64 in one embodiment. The purpose of this implementation is shift or retard the effect of the induced magnetic force exerted by elements of the stator 20 on the ferritic elements 60 to smooth out the effect of the applied torque to reduce or eliminate torque ripple and associated vibration during operation. Alternatively, alignments and/or rotational positions of a portion of either or both of the first and second ferritic elements 61, 62 about the x-axis 7 may be staggered in relation to electro-magnetic elements 25 of the stator 20 to adjust pole alignment in order to smooth out the effect of applied torque to reduce or eliminate vibration during operation.

When the rotary electric machine 100 is assembled, the radially-oriented, inwardly-projecting ferromagnetic elements 28 arranged on the first flange 21 of the stator 20 and the radially-oriented, inwardly-projecting ferromagnetic elements 28 arranged on the second flange 22 of the stator 20 are axially adjacent to the ferritic elements 60 that are attached on the outer surface 54 of the rotor 50. When activated, the electro-magnetic coil 26 generates an electro-magnetic force that is transferred via the core 27 to a corresponding one of the radially-oriented, inwardly-projecting ferromagnetic elements 28 arranged on the first flange 21 and the axially opposed one of the radially-oriented, inwardly-projecting ferromagnetic elements 28 arranged on the second flange 22, thus exerting axial flux that acts upon one of the ferritic elements 60 that are attached on the outer surface 54 of the rotor 50 to generate torque upon the rotor 50.

In one embodiment, and as described herein, the stator is composed of 60 poles arranged in a three-phase circuit, which may be designated as phases A, B, and C, which can be controlled to produce a desired direction of rotation. The rotor 50 is a reluctor ring having a quantity of twenty equally-spaced steel core elements. In operation, the twenty ferritic elements 60 that are attached on the outer surface 54 of the rotor 50 are pulled into alignment with the rotating magnetic fields that are generated by sequentially activated ferromagnetic elements 28 as arranged in phases A, B, and C.

Figure 5:
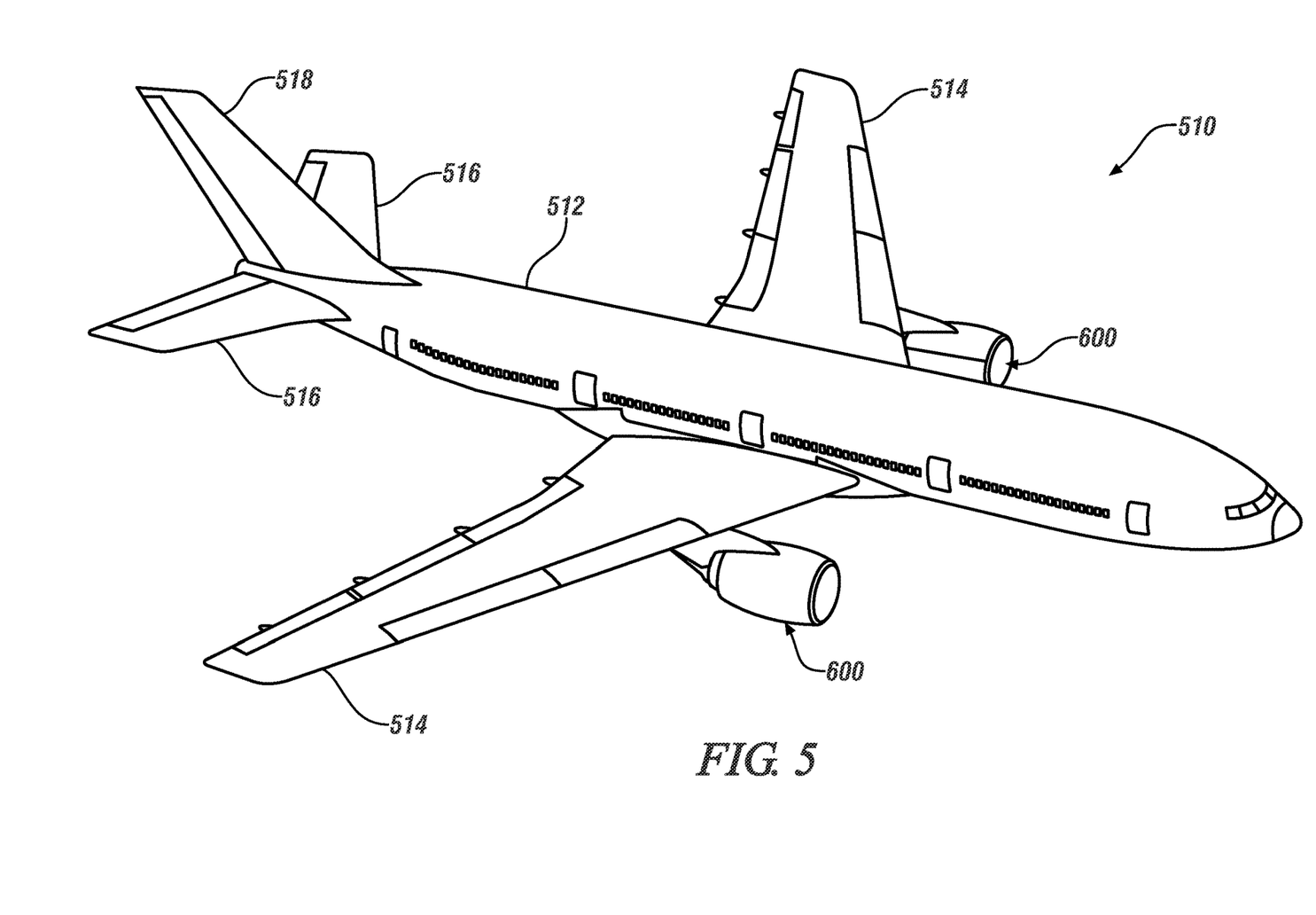
FIG. 5 schematically illustrates an aircraft that includes hybrid turbine engines such as a turbofan jet including a fan element and a brushless electric ring motor, in accordance with the disclosure.

FIG. 5 schematically illustrates an aircraft 510 that may include and utilize one or more hybrid turbine engines 600, such as described below with reference to FIG. 6. Aircraft 510 includes a fuselage 512, one or more wings 514, a horizontal stabilizer 516, and a vertical stabilizer 518. The aircraft 510 also includes one or more hybrid turbine engines 600, an example of which is disclosed with reference to FIG. 6. Examples of the aircraft 510 include an airplane, a commercial aircraft, and/or a military aircraft. Alternatively, an embodiment of the rotary electric machine 100 that is described with reference to FIGS. 1-4 may be employed as a propulsion device on a flying car, a drone, an electric vertical takeoff and landing vehicle (eVTOL), etc. Alternatively, an embodiment of the rotary electric machine 100 that is described with reference to FIGS. 1-4 may be employed as a propulsion device on a marine system.

Figure 6:
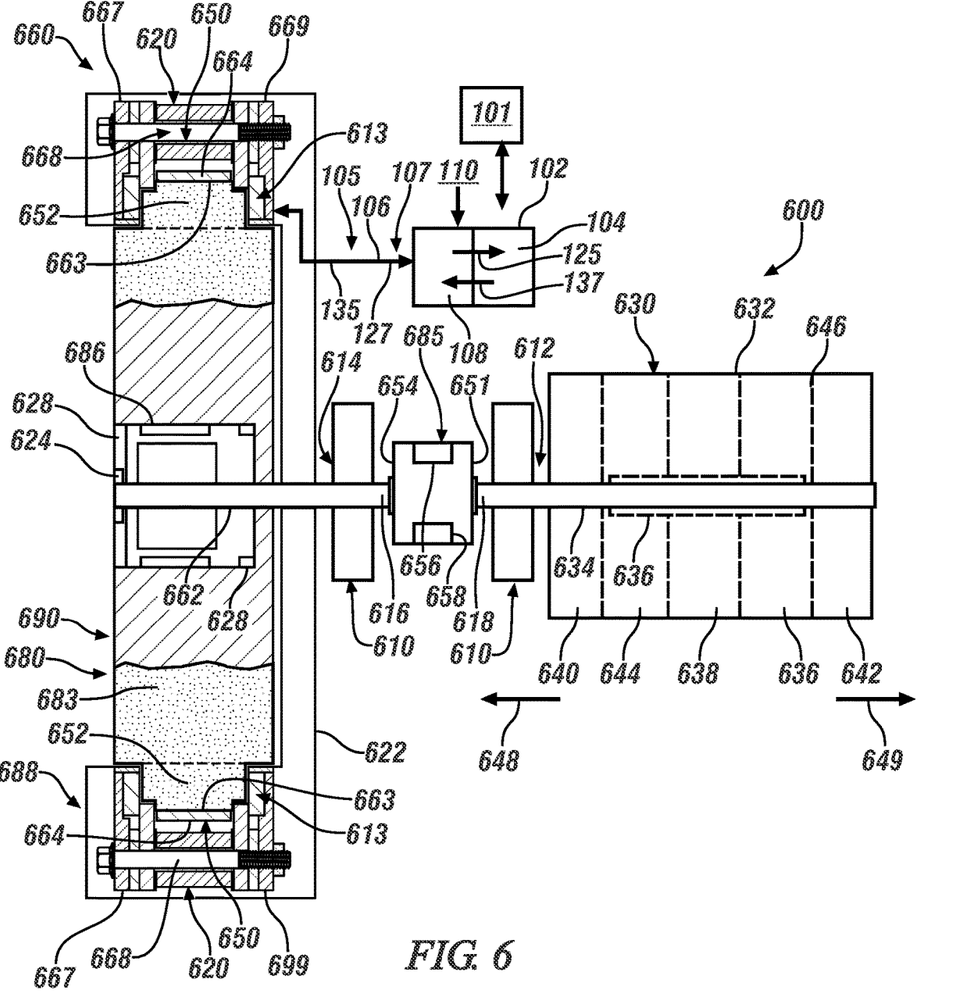
FIG. 6 schematically shows details related to a hybrid turbofan jet having a fan element that is powered by an embodiment of a brushless electric ring motor, in accordance with the disclosure.

FIG. 6 schematically illustrates a cross-sectional view of an embodiment of a hybrid turbine engine 600. The hybrid turbine engine 600 includes a first thrust-generating system 630 that is rotatably coupled to a second thrust-generating system 680 via a clutch 685. The first thrust-generating system 630 includes a liquid-fuel powered gas turbine engine 632 having a turbine rotary shaft 634. The second thrust-generating system 680 includes a rotary electric machine 660 that is electrically powered via an electric power system 110.

The rotary electric machine 660 is an embodiment of the rotary electric machine 100 that is described with reference to FIGS. 1-4, and includes an annular rotor 650 and fan 690 that are arranged within and rotatable within an annular stator 620 on guide element 613. The stator 620 is housed in the outer periphery region 688 of the engine case structure 622. The rotary electric machine 660 is arranged as a brushless electric ring motor. Analogous to the rotary electric machine 100 that is described with reference to FIGS. 1-4, rotor 650 is includes an annular ring 652 having a plurality of ferritic elements 664 arranged on an outer surface 663 thereof, and the stator 620 includes an annular device having a plurality of electro-magnetic elements 668 arranged between a first flange 667 and a second flange 669. The controllable electro-magnetic elements 668 of the stator 620 are electrically connected to an electric power source 102 via an electric power inverter 108 that is controlled by a controller 101. The controller 101 is operatively connected to the electric power inverter 108 to control transfer of electric power between the electric power source 102 and the plurality of electro-magnetic elements 668 of the stator 620. The controller 101 controls the electric power inverter 108 to sequentially electrically activate the controllable electro-magnetic elements 668 to exert a rotating magnetic force on the plurality of ferritic elements 664 arranged on the rotor 650 to effect rotation of the rotor 650, or to react torque to retard rotation of the rotor 650.

The clutch 685 includes a clutch input 651, which is operatively coupled to the turbine rotary shaft 634, and a clutch output 654 that is operatively coupled to the machine rotary shaft 662. The clutch 685 defines a plurality of operational states including at least an engaged state, wherein the clutch input 651 is rotationally coupled to the clutch output 654, and a disengaged state, wherein the clutch input 651 is decoupled from the clutch output 654.

During operation of the hybrid turbine engine 600, the turbine 632 of first thrust-generating system 630 may be utilized to provide a motive force for rotation of the turbine rotary shaft 634. In addition, the clutch 685 may be utilized to selectively and rotationally engage, or disengage, the turbine rotary shaft 634 and the machine rotary shaft 662, thereby selectively providing a motive force for rotation of the machine rotary shaft 662. This includes the hybrid turbine engine 600 being operative in several modes, including Mode 1, Mode 2, and Mode 3. Mode 1 includes operation of the hybrid turbine engine 600 with the clutch 685 engaged and with the rotary electric machine 660 being deactivated, and in a free-wheeling state. When operating in Mode 1, rotational torque is generated by the gas turbine engine 632 of the first thrust-generating system 630 to spin the rotor 650 and fan 690. Mode 2 includes operation of the hybrid turbine engine 600 with the clutch 685 disengaged. When operating in Mode 2, the rotary electric machine 660 operates to spin the fan 690 independently of the operation of the first thrust-generating system 630. Mode 3 includes operation of the hybrid turbine engine 600 with the clutch 685 engaged and actively controlling the rotary electric machine 660. When operating in Mode 3, the gas turbine engine 632 of the first thrust-generating system 630 and the rotary electric machine 660 are controlled in concert to spin the rotor 650 and fan 690.

The first thrust-generating system 630 includes any turbine 632, or turbine assembly that includes the turbine rotary shaft 634 that is configured to generate a first thrust. As an example, the turbine rotary shaft 634 may be a low-speed turbine rotary shaft 634 that rotates at a low-speed shaft rotational frequency. Under these conditions, the first thrust-generating system 630 also may include a high-speed turbine rotary shaft 636 that rotates at a high-speed shaft rotational frequency. The high-speed shaft rotational frequency may be greater than the low-speed shaft rotational frequency.

The first thrust-generating system 630 also includes a combustion chamber 638, which is configured to receive and to combust a fuel to power the first thrust-generating system. The first thrust-generating system 630 further may include a compressor 640, which also may be referred to herein as a low-pressure compressor 640. The compressor 640 may be upstream, or positioned in an upstream direction 648, from the combustion chamber 638, may be operatively coupled to the turbine rotary shaft 634, and/or may be configured to rotate with the turbine rotary shaft.

The first thrust-generating system 630 also includes a turbine 642, which also may be referred to herein as a low-pressure turbine 642. The turbine 642 may be downstream, or positioned in a downstream direction 649 from combustion chamber 638, is operatively coupled to the turbine rotary shaft 634, and is configured to rotate with the turbine rotary shaft.

The first thrust-generating system 630 further may include a high-pressure compressor 644. The high-pressure compressor 644, when present, may be downstream from low-pressure compressor 640, may be upstream from the combustion chamber 638, may be operatively coupled to high-speed turbine rotary shaft 636, and/or may be configured to rotate with the high-speed turbine rotary shaft.

The first thrust-generating system 630 also may include a high-pressure turbine 646. High-pressure turbine 646, when present, may be downstream from the combustion chamber 638, may be upstream from low-pressure turbine 642, may be operatively coupled to high-speed turbine rotary shaft 636, and/or may be configured to rotate with the high-speed turbine rotary shaft.

Second thrust-generating system 680 may include any suitable structure that may be operatively coupled to the machine rotary shaft 662 and/or that may be configured to generate a second thrust that is independent of the first thrust generated by the first thrust-generating system 630. An example of the second thrust-generating system 680 includes a fan 690.

When second thrust-generating system 680 includes the fan 690, the hybrid turbine engine 600 also may be referred to herein as a turbofan hybrid turbine engine, as a hybrid turbofan engine, and/or as a turbofan engine.

The clutch 685 includes any suitable structure that may be adapted, configured, designed, and/or constructed to include clutch input 651 and clutch output 654, and defines at least the engaged state and the disengaged state. Examples of the clutch 685 include an overrunning clutch, a one-way clutch, a one-way tapered clutch, a tooth clutch, and/or a synchronized clutch. Operation of the clutch may be controlled autonomically, or alternatively, may be controlled by a controller.

The hybrid turbine engine 600 and/or clutch 685 thereof may include a synchronization structure 656. Synchronization structure 656, when present, may be configured to synchronize clutch input 651 and clutch output 654, such as to permit clutch 685 to transition from the disengaged state to the engaged state and/or from the engaged state to the disengaged state while clutch input 651 and/or clutch output 654 rotates. An example of synchronization structure 656 includes a speed controller (not shown) configured to control a rotational frequency of rotary electric machine 660 to synchronize the clutch output to the clutch input. This may include synchronization of the clutch output 654 to the clutch input 651 to the same, or similar, respective rotational frequencies, such as to permit and/or facilitate low-friction engagement and/or disengagement of clutch 685 at any suitable synchronized rotational frequency.

The clutch 685 may be an automatic, or an automatically actuated, clutch 685. Such an automatic clutch 685 may be configured to automatically rotationally couple clutch input 651 to clutch output 654 when a clutch input rotational frequency of the clutch input is greater than a clutch output rotational frequency of the clutch output. Such an automatic clutch 685 additionally or alternatively may be configured to automatically decouple clutch input 651 from clutch output 654 when the clutch input rotational frequency is less than the clutch output rotational frequency.

The clutch 685 may be a selectively actuated clutch 685. Such a selectively actuated clutch 685 may be configured to be selectively actuated between the engaged state and the disengaged state, such as by an operator, or by the controller 101 of the hybrid turbine engine 600.

As an example, the clutch 685 may include an engagement structure 658 that is configured to selectively transition the clutch 685 between the engaged state and the disengaged state. Examples of engagement structure 658 include an actuator, a lever, an electrically actuated engagement structure, a mechanically actuated engagement structure, and/or a hydraulically actuated engagement structure.

The rotary electric machine 660 employs the electric power input 105 to generate torque that is exerted by the rotor 650, and may also be configured to react torque that is exerted by movement of air across the fan 690 of the rotor 650 to generate electric power output 107.

In one embodiment, the machine rotary shaft 662 may be aligned, or axially aligned with the turbine rotary shaft 634, as illustrated. Alternatively, the machine rotary shaft 662 may be axially offset from the turbine rotary shaft 634. The machine rotary shaft 662 may be arranged parallel to the turbine rotary shaft 634.

The second thrust-generating system 680 may include a central hub 686.

One configuration may permit and/or facilitate inclusion of a forward bearing 624 in the hybrid turbine engine 600. The forward bearing 624 may be forward of, or in upstream direction 648 from, at least a portion of the rotary electric machine 660 and/or the second thrust-generating system 680 and may be configured to support the machine rotary shaft 662 and/or the central hub 686 on a front, forward, or upstream side of the central hub 686. The hybrid turbine engine 600 further may include an aft bearing, which also may support central hub 686, such as on an aft side of the central hub 686.

The fan 690 includes fan blades 683 that extend from the central hub 686 and attach to the rotor 650.

The hybrid turbine engine 600 also may include a pitch control device 628. The pitch control device 628, when present, may be configured to adjust a pitch of fan blades 683. As an example, the pitch control device 628 may be configured to rotate the fan blades 683 relative to the central hub 686 and/or about an elongate axis thereof. At least a portion of the pitch control device 628 may be operatively attached to and/or configured to rotate with central hub 686.

The clutch input 651 may be directly, or directly and operatively coupled the turbine rotary shaft 634. As also illustrated, clutch output 654 may be directly, or directly and operatively, coupled to machine rotary shaft 662. However, such a configuration is not required, and it is within the scope of the present disclosure that one or more structures may extend between, or operatively couple, clutch input 651 to turbine rotary shaft 634. Additionally or alternatively, one or more structures may extend between, or operatively couple the clutch output 654 to the machine rotary shaft 662.

As an example, the hybrid turbine engine 600 may include one or multiple gear boxes 610. The gear box 610, when present, may be positioned between the first thrust-generating system 630 and the second thrust-generating system 680 and/or between the turbine rotary shaft 634 and the machine rotary shaft 662. In such a configuration, the gear box 610 may be configured to provide a predetermined rotational speed ratio between the turbine rotary shaft and the machine rotary shaft 662 when clutch 685 is in the engaged state.

In one embodiment, the gear box 610 may be positioned between, or may operatively couple the turbine rotary shaft 634 and the clutch 685. Under these conditions, the gear box 610 may include a gear box input 612, which may be operatively coupled, or directly operatively coupled, to the turbine rotary shaft 634. In addition, gear box 610 may include an output stub shaft 618, which may be operatively coupled, or directly operatively coupled, to the clutch input 651.

Additionally or alternatively, gear box 610 may be positioned between, or may operatively couple the clutch 685 and the machine rotary shaft 662. Stated another way, the clutch output 654 may be operatively coupled to the machine rotary shaft 662 via the gear box 610. Under these conditions, the gear box 610 may include an input stub shaft 616, which may be operatively coupled, or directly operatively coupled, to clutch output 654. In addition, the gear box 610 may include a gear box output 614, which may be operatively coupled, or directly operatively coupled, to the machine rotary shaft 662.

The hybrid turbine engine 600 includes an electric power system 110, which is controlled by a control system 101. The electric power system 110 includes any structure that may be configured to provide electric power input 105 to the controllable electro-magnetic elements 668 of the stator 620 of the rotary electric machine 660 and also to receive electric power output 107 from the rotary electric machine 660. As an example, the electric power system 110 may include the electric power source 102 that may be configured to provide electric power input 105 to the rotary electric machine 660 and also to receive electric power output 107 from the rotary electric machine 660. The electric power source 102 may be an energy storage device that may be arranged to store electric energy and/or supply electric current. Examples of the electric power source 102 includes a DC power source 104, an ultracapacitor, a fuel cell, etc.

The electric power system 110 also may include a power supply conduit 106. Power supply conduit 106 may extend between the electric power source 102 and the rotary electric machine 660, may be configured to convey electric power input 105 from the electric power source 102 to the controllable electro-magnetic elements 668 of the stator 620 of rotary electric machine 660, and/or may be configured to convey electric power output 107 from the controllable electro-magnetic elements 668 of the stator 620 of rotary electric machine 660 to the electric power source 102. Examples of power supply conduit 106 include at least one electrical conductor, at least one wire, at least one insulated wire, and/or at least one electrical wire.

The electric power system 110 includes an electric power inverter 108. Electric power inverter 108 is configured to receive an unconditioned electric power input 125 from the electric power source 102, to condition the unconditioned electric power input to produce and/or generate a conditioned electric power input 135, and/or to provide the conditioned electric power input to the rotary electric machine 660. Additionally, the electric power inverter 108 may be configured to receive an unconditioned electric power output 127 from the rotary electric machine 660, to condition the unconditioned electric power output to produce and/or generate a conditioned electric power output 137, and/or to provide the conditioned electric power output to the electric power source 102. An example of unconditioned electric power input 125 includes a direct current (DC) unconditioned electric power input. Examples of conditioned electric power input 135 include an alternating current (AC) conditioned electric power input, a single phase AC conditioned electric power input, and/or a three phase AC conditioned electric power input. Examples of unconditioned electric power output 127 include an alternating current (AC) unconditioned electric power output, a single phase AC unconditioned electric power output, and/or a three phase AC unconditioned electric power output. An example of conditioned electric power output 137 includes a DC conditioned electric power output.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The components of the disclosed embodiments, as described and illustrated herein, may be arranged and designed in a variety of different configurations. Thus, the detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

The following Clauses provide example configurations of a rotary electric machine, as disclosed herein.

Clause 1. A rotary electric machine, comprising: a brushless electric ring motor having an inner rotor disposed within an outer stator and arranged to rotate therein on a guide element; wherein the rotor is an annular device having a plurality of ferritic elements arranged on an outer surface thereof; wherein the stator is an annular device having a plurality of electro-magnetic elements arranged on an inner portion between a first flange and a second flange; wherein each of the first and second flanges is an annular ring that is fabricated from a non-magnetic material and has a plurality of radially-oriented, inwardly-projecting ferromagnetic elements; wherein the plurality of radially-oriented, inwardly-projecting ferromagnetic elements are coupled to corresponding ones of the electro-magnetic elements; wherein the plurality of radially-oriented, inwardly-projecting ferromagnetic elements are arranged to exert a magnetic force on the plurality of ferritic elements when the plurality of electro-magnetic elements are electrically activated; and wherein the guide element for the rotor is disposed between the first flange and the second flange of the stator.

Clause 2. The rotary electric machine of Clause 1, further comprising a controller, and an electric power source electrically connected to an electric power inverter, wherein the controller is operatively connected to the electric power inverter to control transfer of electric power between the electric power source and the plurality of electro-magnetic elements.

Clause 3. The rotary electric machine of any of Clauses 1-2, wherein each of the plurality of electro-magnetic elements includes an electro-magnetic coil and a core; and wherein the plurality of radially-oriented, inwardly-projecting ferromagnetic elements are magnetically coupled and mechanically connected to the corresponding electro-magnetic coil via the core.

Clause 4. The rotary electric machine of any of Clauses 1-3, wherein the rotary electric machine is arranged as a synchronous reluctance electric machine.

Clause 5. The rotary electric machine of any of Clauses 1-4, wherein the plurality of ferritic elements arranged on the outer surface of the rotor include a first plurality of first ferritic elements and a second plurality of second ferritic elements, wherein the first ferritic elements are placed in alternating manner with the second ferritic elements around the outer surface of the rotor.

Clause 6. The rotary electric machine of any of Clauses 1-5, wherein each of the first ferritic elements is configured as a rectangular prism element having a rectangular leading edge, and wherein each of the second ferritic elements is configured as a rectangular prism element having a rounded leading edge.

Clause 7. The rotary electric machine of any of Clauses 1-6, wherein the plurality of ferritic elements are fabricated from electrical steel.

Clause 8. The rotary electric machine of any of Clauses 1-7, wherein the annular device of the rotor is fabricated from a non-ferritic material.

Clause 9. The rotary electric machine of any of Clauses 1-8, wherein each of the plurality of radially-oriented, inwardly-projecting ferromagnetic elements is magnetically isolated from adjacent radially-oriented, inwardly-projecting ferromagnetic elements.

Clause 10. The rotary electric machine of any of Clauses 1-9, wherein the plurality of ferritic elements arranged on the rotor comprises a first quantity, wherein the plurality of electro-magnetic elements comprises a second quantity, and wherein a ratio of the first quantity to the second quantity is 1:3.

Clause 11. The rotary electric machine of any of Clauses 1-10, comprising the plurality of radially-oriented, inwardly-projecting ferromagnetic elements being magnetically coupled to corresponding ones of the electro-magnetic elements via a steel core.

Clause 12. The rotary electric machine of any of Clauses 1-11, comprising the plurality of radially-oriented, inwardly-projecting ferromagnetic elements being axially adjacent to the plurality of ferritic elements that are arranged on the outer surface of the rotor.

Clause 13. The rotary electric machine of any of Clauses 1-12, wherein the guide element for the rotor comprises first and second thrust washers and a radial washer that are fabricated from non-ferritic materials.

Clause 14. The rotary electric machine of any of Clauses 1-13, wherein the plurality of ferritic elements arranged on the rotor are equidistantly spaced on the outer surface thereof; and wherein the plurality of electro-magnetic elements arranged on the stator are equidistantly spaced on an inner portion thereof between the first flange and the second flange.

Clause 15. A method for arranging a synchronous reluctance electric machine, comprising: fabricating an annular rotor, including arranging a plurality of ferritic elements on an outer surface of a non-ferritic annular ring, including a plurality of first ferritic elements and a plurality of second ferritic elements, wherein the first ferritic elements are arranged in alternating manner with the second ferritic elements; fabricating an annular stator, including: arranging a plurality of electro-magnetic elements between a first flange and a second flange, wherein each of the first and second flanges is an annular ring that is fabricated from a non-magnetic material, and wherein each of the electro-magnetic elements includes an electro-magnetic coil, a core, and radially-oriented, inwardly-projecting ferromagnetic elements, and arranging a guide element on an inner portion between the first flange and the second flange; and arranging the annular rotor on the guide element of the annular stator, wherein the annular rotor is rotatable on the guide element on the inner portion of the annular stator.

Clause 16. A thrust generating system for a turbojet engine, comprising: a rotary electric machine having a plurality of radially-oriented fan blades mounted on an inner surface of a rotor; wherein the plurality of radially-oriented fan blades are joined at an axial center of the rotor; and wherein the rotary electric machine includes: the rotor disposed within an outer stator and arranged to rotate therein on a guide element; wherein the rotor is an annular device having a plurality of ferritic elements arranged on an outer surface thereof; wherein the stator is an annular device having a plurality of electro-magnetic elements arranged on an inner portion thereof between a first flange and a second flange; wherein each of the first and second flanges is an annular ring that is fabricated from a non-magnetic material and has a plurality of radially-oriented, inwardly-projecting ferromagnetic elements; wherein the plurality of radially-oriented, inwardly-projecting ferromagnetic elements are magnetically coupled to corresponding ones of the electro-magnetic elements; wherein the plurality of radially-oriented, inwardly-projecting ferromagnetic elements are arranged to exert a magnetic force on the plurality of ferritic elements when the plurality of electro-magnetic elements are electrically activated; and wherein the guide element for the rotor is disposed between the first flange and the second flange of the stator.

Clause 17. The thrust generating system of any of Clause 16, further comprising an axially aligned shaft element being rotatably coupled to a hub disposed at the axial center of the rotor.

Clause 18. The thrust generating system of any of Clauses 16-17, comprising the plurality of radially-oriented, inwardly-projecting ferromagnetic elements being axially adjacent to the plurality of ferritic elements that are arranged on the outer surface of the rotor.

Clause 19. The thrust generating system of any of Clauses 16-18, wherein the guide element for the rotor comprises first and second thrust washers and a radial washer that are fabricated from non-ferritic materials.

Clause 20. The thrust generating system of any of Clauses 16-19, wherein the plurality of ferritic elements arranged on the rotor are equidistantly spaced on an outer surface thereof; and wherein the plurality of electro-magnetic elements arranged on the stator are equidistantly spaced on an inner portion thereof between the first flange and the second flange.

Furthermore, the detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A rotary electric machine, comprising:
   a brushless electric ring motor having an inner rotor disposed within an outer stator and arranged to rotate therein on a guide element;
   wherein the rotor is an annular device having a plurality of ferritic elements arranged on an outer surface thereof;
   wherein the stator is an annular device having a plurality of electro-magnetic elements arranged on an inner portion between a first flange and a second flange;

wherein each of the first and second flanges is an annular ring that is fabricated from a non-magnetic material and has a plurality of radially-oriented, inwardly-projecting ferromagnetic elements;

wherein the plurality of radially-oriented, inwardly-projecting ferromagnetic elements are coupled to corresponding ones of the electro-magnetic elements;

wherein the plurality of radially-oriented, inwardly-projecting ferromagnetic elements are arranged to exert a magnetic force on the plurality of ferritic elements when the plurality of electro-magnetic elements are electrically activated; and wherein the guide element for the rotor is disposed between the first flange and the second flange of the stator.

2. The rotary electric machine of claim 1, further comprising a controller, and an electric power source electrically connected to an electric power inverter, wherein the controller is operatively connected to the electric power inverter to control transfer of electric power between the electric power source and the plurality of electro-magnetic elements.

3. The rotary electric machine of claim 1, wherein each of the plurality of electro-magnetic elements includes an electro-magnetic coil and a core; and wherein the plurality of radially-oriented, inwardly-projecting ferromagnetic elements are magnetically coupled and mechanically connected to the corresponding electro-magnetic coil via the core.

4. The rotary electric machine of claim 1, wherein the rotary electric machine is arranged as a synchronous reluctance electric machine.

5. The rotary electric machine of claim 1, wherein the plurality of ferritic elements arranged on the outer surface of the rotor include a first plurality of first ferritic elements and a second plurality of second ferritic elements, wherein the first ferritic elements are placed in alternating manner with the second ferritic elements around the outer surface of the rotor.

6. The rotary electric machine of claim 5, wherein each of the first ferritic elements is configured as a rectangular prism element having a rectangular leading edge, and wherein each of the second ferritic elements is configured as a rectangular prism element having a rounded leading edge.

7. The rotary electric machine of claim 1, wherein the plurality of ferritic elements are fabricated from electrical steel.

8. The rotary electric machine of claim 1, wherein the annular device of the rotor is fabricated from a non-ferritic material.

9. The rotary electric machine of claim 1, wherein each of the plurality of radially-oriented, inwardly-projecting ferromagnetic elements is magnetically isolated from adjacent radially-oriented, inwardly-projecting ferromagnetic elements.

10. The rotary electric machine of claim 1, wherein the plurality of ferritic elements arranged on the rotor comprises a first quantity, wherein the plurality of electro-magnetic elements comprises a second quantity, and wherein a ratio of the first quantity to the second quantity is 1:3.

11. The rotary electric machine of claim 1, comprising the plurality of radially-oriented, inwardly-projecting ferromagnetic elements being magnetically coupled to corresponding ones of the electro-magnetic elements via a steel core.

12. The rotary electric machine of claim 1, comprising the plurality of radially-oriented, inwardly-projecting ferromagnetic elements being axially adjacent to the plurality of ferritic elements that are arranged on the outer surface of the rotor.

13. The rotary electric machine of claim 1, wherein the guide element for the rotor comprises first and second thrust washers and a radial washer that are fabricated from non-ferritic materials.

14. The rotary electric machine of claim 1, wherein the plurality of ferritic elements arranged on the rotor are equidistantly spaced on the outer surface thereof; and wherein the plurality of electro-magnetic elements arranged on the stator are equidistantly spaced on an inner portion thereof between the first flange and the second flange.

15. A method for arranging a synchronous reluctance electric machine, comprising:

fabricating an annular rotor, including arranging a plurality of ferretic elements on an outer surface of a non-ferretic annular ring, including a plurality of first ferretic elements and a plurality of second ferretic elements, wherein the first ferretic elements are arranged in alternating manner with the second ferretic elements;

fabricating an annular stator, including:

arranging a plurality of electro-magnetic elements between a first flange and a second flange, wherein each of the first and second flanges is an annular ring that is fabricated from a non-magnetic material, and wherein each of the electro-magnetic elements includes an electro-magnetic coil, a core, and radially-oriented, inwardly-projecting ferromagnetic elements, and arranging a guide element on an inner portion between the first flange and the second flange; and arranging the annular rotor on the guide element of the annular stator, wherein the annular rotor is rotatable on the guide element on the inner portion of the annular stator.

16. A thrust generating system for a turbojet engine, comprising:

a rotary electric machine having a plurality of radially-oriented fan blades mounted on an inner surface of a rotor;

wherein the plurality of radially-oriented fan blades are joined at an axial center of the rotor; and wherein the rotary electric machine includes:

the rotor disposed within an outer stator and arranged to rotate therein on a guide element;

wherein the rotor is an annular device having a plurality of ferritic elements arranged on an outer surface thereof;

wherein the stator is an annular device having a plurality of electro-magnetic elements arranged on an inner portion thereof between a first flange and a second flange;

wherein each of the first and second flanges is an annular ring that is fabricated from a non-magnetic material and has a plurality of radially-oriented, inwardly-projecting ferromagnetic elements;

wherein the plurality of radially-oriented, inwardly-projecting ferromagnetic elements are magnetically coupled to corresponding ones of the electro-magnetic elements;

wherein the plurality of radially-oriented, inwardly-projecting ferromagnetic elements are arranged to exert a magnetic force on the plurality of ferritic elements when the plurality of electro-magnetic elements are electrically activated; and wherein the guide element for the rotor is disposed between the first flange and the second flange of the stator.

17. The thrust generating system of claim 16, further comprising an axially aligned shaft element being rotatably coupled to a hub disposed at the axial center of the rotor.

18. The thrust generating system of claim 16, comprising the plurality of radially-oriented, inwardly-projecting ferromagnetic elements being axially adjacent to the plurality of ferritic elements that are arranged on the outer surface of the rotor.

19. The thrust generating system of claim 16, wherein the guide element for the rotor comprises first and second thrust washers and a radial washer that are fabricated from non-ferritic materials.

20. The thrust generating system of claim 16, wherein the plurality of ferritic elements arranged on the rotor are equidistantly spaced on an outer surface thereof; and wherein the plurality of electro-magnetic elements arranged on the stator are equidistantly spaced on an inner portion thereof between the first flange and the second flange.

\* \* \* \* \*